United States Patent [19]
Oba

[11] Patent Number: 6,046,965
[45] Date of Patent: Apr. 4, 2000

[54] TIMER DEVICE HAVING TIMER COUNTER

[75] Inventor: Kaori Oba, Tokyo, Japan

[73] Assignee: NEC Corporation, Tokyo, Japan

[21] Appl. No.: 09/157,534

[22] Filed: Sep. 21, 1998

[30] Foreign Application Priority Data

Sep. 19, 1997 [JP] Japan ..................................... 9-255310

[51] Int. Cl.[7] .......................... G04B 23/02; G04C 21/00; H03K 3/02
[52] U.S. Cl. ................................. 368/73; 368/250; 377/39
[58] Field of Search ...................... 368/72–74, 107–109, 368/250, 251; 377/39, 55, 56

[56] References Cited

U.S. PATENT DOCUMENTS 4,805,199  2/1989  Muramatsu ............................... 377/39

FOREIGN PATENT DOCUMENTS 369963    5/1990  European Pat. Off. .
42 04 730 3/1994  Germany .

OTHER PUBLICATIONS

"Hardware Support For An Operating System Timer", IBM Technical disclosure Bulletin, vol. 34, No. 10B, March 1992, pp. 237–238.
"Simulation of Multiple Timers Using One Actual Timer", IBM Technical Disclosure Bulletin, vol. 38, No. 3, March 1995, pp. 301–303.

Primary Examiner—Vit Miska
Attorney, Agent, or Firm—Sughrue, Mion, Zinn, Macpeak & Seas, PLLC

[57] ABSTRACT

A coincidence signal is output when coincidence of a timer counter with the set value of a comparison register is detected by a coincidence detecting circuit and the coincidence signal is input to the external CPU as an interruption signal to execute a CPU to start an interruption routine. In the interruption routine, a reverse enable flag is set, a flag indicating permission to reverse an output signal when the value of a key counter is larger than the value of a buzzer counter and a reverse enable flag is set, a flag indicating prohibition of reversing the output signal when the value of the key counter is smaller than that of the buzzer counter.

23 Claims, 8 Drawing Sheets

FIG. 2A (key) : KEYCOUNTER (PLACED IN RAM)
(buz) : BUZZER COUNTER (PLACED IN RAM)
key_i : KEY INTERRUPTION INTERVAL TIME
buz_i : TERMINAL REVERSE INTERNAL TIME

FIG. 2B (key) : KEYCOUNTER (PLACED IN RAM)
(buz) : BUZZER COUNTER (PLACED IN RAM)
key_i : KEY INTERRUPTION INTERVAL TIME
buz_i : TERMINAL REVERSE INTERNAL TIME

FIG. 8B (key) : KEYCOUNTER
(PLACED IN RAM)
(buz) : BUZZER COUNTER
(PLACED IN RAM)
key_i : KEY INTERRUPTION
INTERVAL TIME
buz_i : TERMINAL REVERSE
INTERNAL TIME (key) : KEYCOUNTER (PLACED IN RAM)
(buz) : BUZZER COUNTER (PLACED IN RAM)
key_i : KEY INTERRUPTION INTERVAL TIME
buz_i : TERMINAL REVERSE INTERNAL TIME

TIMER DEVICE HAVING TIMER COUNTER

BACKGROUND OF THE INVENTION

1. Field of the Invention

The present invention relates to a timer device, and more particularly, to a timer device having a timer counter.

2. The Related Art

Figure 7:
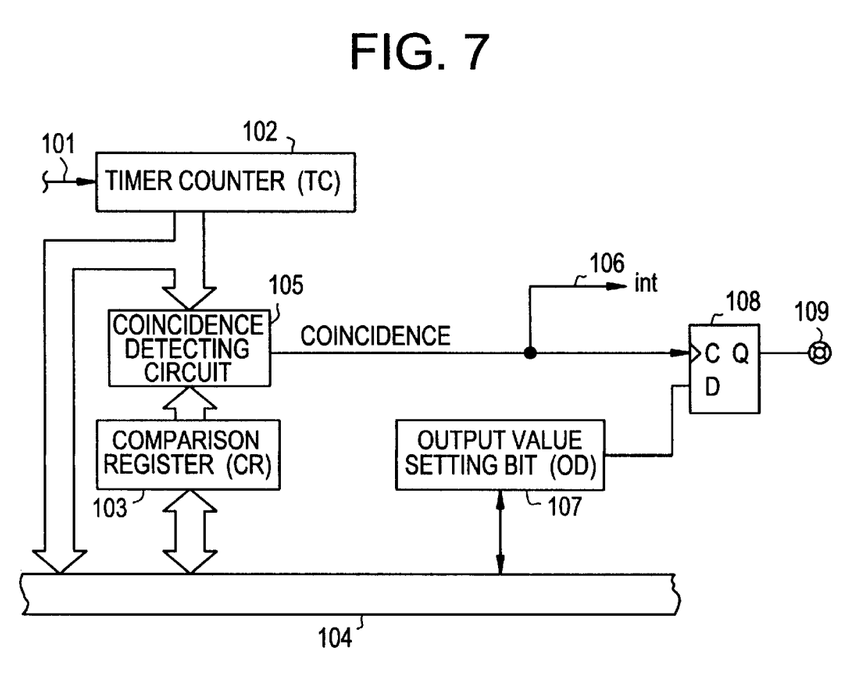
FIG. 7 is a block diagram of an example of a conventional timer device.

FIG. 7 is a block diagram showing one example of a conventional timer device. According to the conventional timer device, a timer counter (TC) 102 is counted up by a count clock signal 101. A comparison register (CR) 103 is connected to a bus(104) and is used for setting a coincidence signal time. A coincidence detecting circuit 105 compares the value of the timer counter (TC) 102 with that of the comparison register (CR) 103 to produce a coincidence signal 106 when both values agree with each other. A clock latch 108 (D flip flop) outputs the value of an output value setting bit (OD) 107 to an output terminal 109 for every output of the coincidence signal 106. Further, data reading and data writing with respect to the comparison register (CR) 103 and the output value setting bit (OD) 107 are carried out through the bus 104.

Figures 8A, 8B:
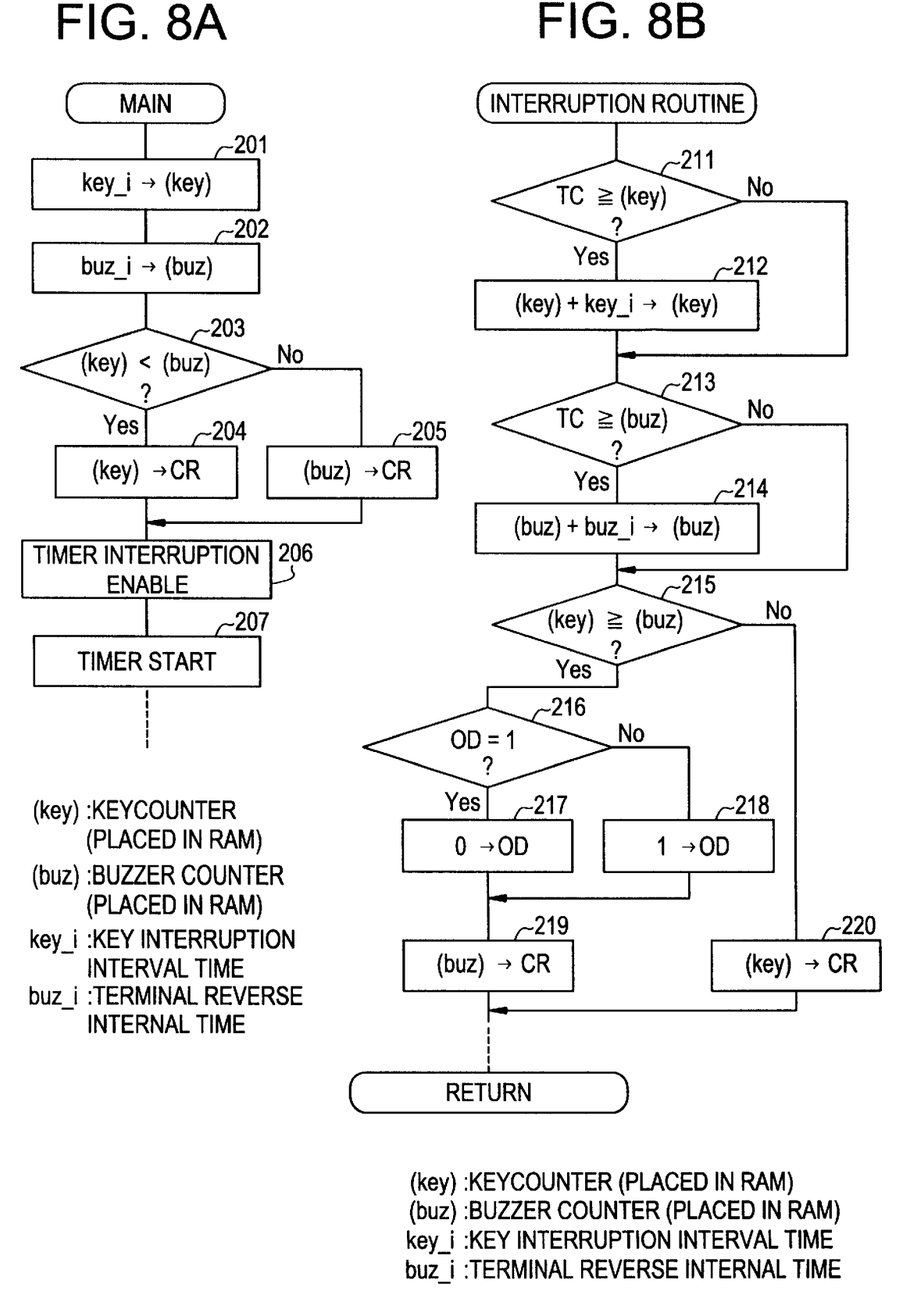
FIGS. 8A–8B are the flowcharts of the parallel processing software of an arithmetic unit connected to the conventional timer device of FIG. 7.
Figure 11:
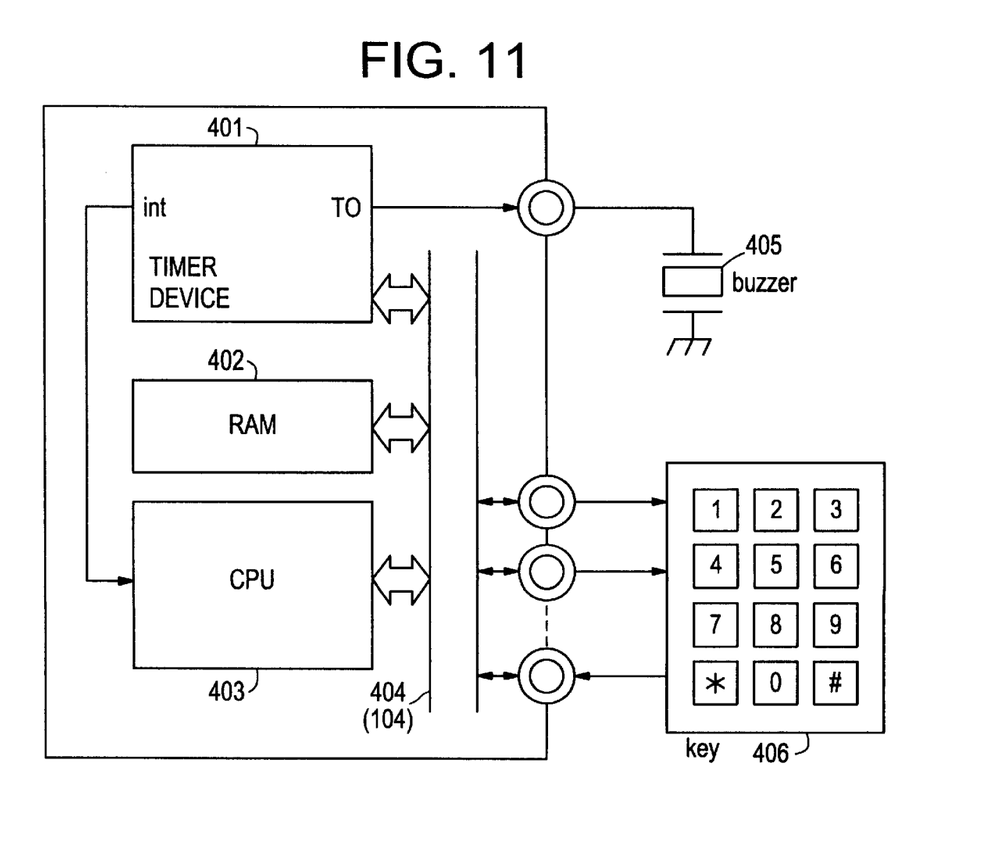
FIG. 11 is an example of a parallel processing application of the timer device.

Now, the operation timing of a CPU in a system for carrying out key matrix control and buzzer control shown in FIG. 11 is explained by referring to the conventional timer device and software flowcharts shown in FIG. 8. In FIG. 11, a timer device 401 is connected through a bus 404 (equivalent to the bus 104 in FIG. 7) to a random access memory (RAM) 402 and a central processing unit (CPU) 403, and is also connected to a buzzer 405. A key 406 is also connected to the bus 404.

In the system described above, the CPU 403 provides a key counter (key) and a buzzer counter (buz) to the RAM 402. In other words, in accordance with a main (MAIN) program shown in FIG. 8A, the initial value key_i of key interruption interval time and the initial value buz_i of terminal reverse interval time are assigned in the key counter (key) and the buzzer counter (buz) (Steps 201, 202).

Then, the value of the key counter (key) is compared with that of the buzzer counter (buz) (Step 203). When the value of the key counter (key) is lower than that of the buzzer counter (buz), the value of the key counter (key) is assigned through the bus 104 in the comparison register (CR) 103 shown in FIG. 7 in the timer device 401 (Step 204). When the value of the buzzer counter (buz) is lower than that of the key counter (key), the value of the buzzer counter (buz) is assigned through the bus 104 in the comparison register (CR) 103 (Step 205). Finally, the CPU 403 enables the interruption of the timer device 401 (Step 206) to start the timer device 401 (Step 207)

In an interruption routine shown in FIG. 8B, comparison is made to see whether or not the value of the key counter (key) shown is below that of the timer counter (TC) 102 (Step 211). If the value of the key counter (key) is below that of the timer counter (TC) 102, key interruption interval time key_i is added to the value of the key counter (key) to renew the value of the key counter (key) (Step 212).

Now, comparison is made to see whether or not the value of the buzzer counter (buz) is below the value of the timer counter (TC) 102 (Step 213). If the value of the buzzer counter (buz) is below that of the timer counter (TC) 102, terminal inverse interval time buz_i is added to the value of the buzzer counter (buz) to renew the value of the buzzer counter (buz) (Step 214).

Now, the value of the key counter (key) is compared with that of the buzzer counter (buz) (Step 215). When the value of the buzzer counter (buz) is below that of the key counter (key), determination is then made to see whether or not the value of the output value setting bit (OD) 107 is "1" (step 216). If the reply is OD=1, the value of the output value setting bit (OD) 107 is inverted (Step 217). The value of the buzzer counter (buz) is substituted in the comparison register (CR) 103 (Step 219). On the other hand, when OD=0 is determined in Step 216, the value of the output value setting bit (OD) 107 is not inverted (Step 218), and the value of the buzzer counter (buz) is substituted for the comparison register (CR) 103 (Step 219). Meanwhile, when Step 215 determined that the value of the buzzer counter (buz) is higher than that of the key counter (key), the value of the key counter (key) is substituted in the comparison register (CR) 103 (Step 220).

Figure 9:
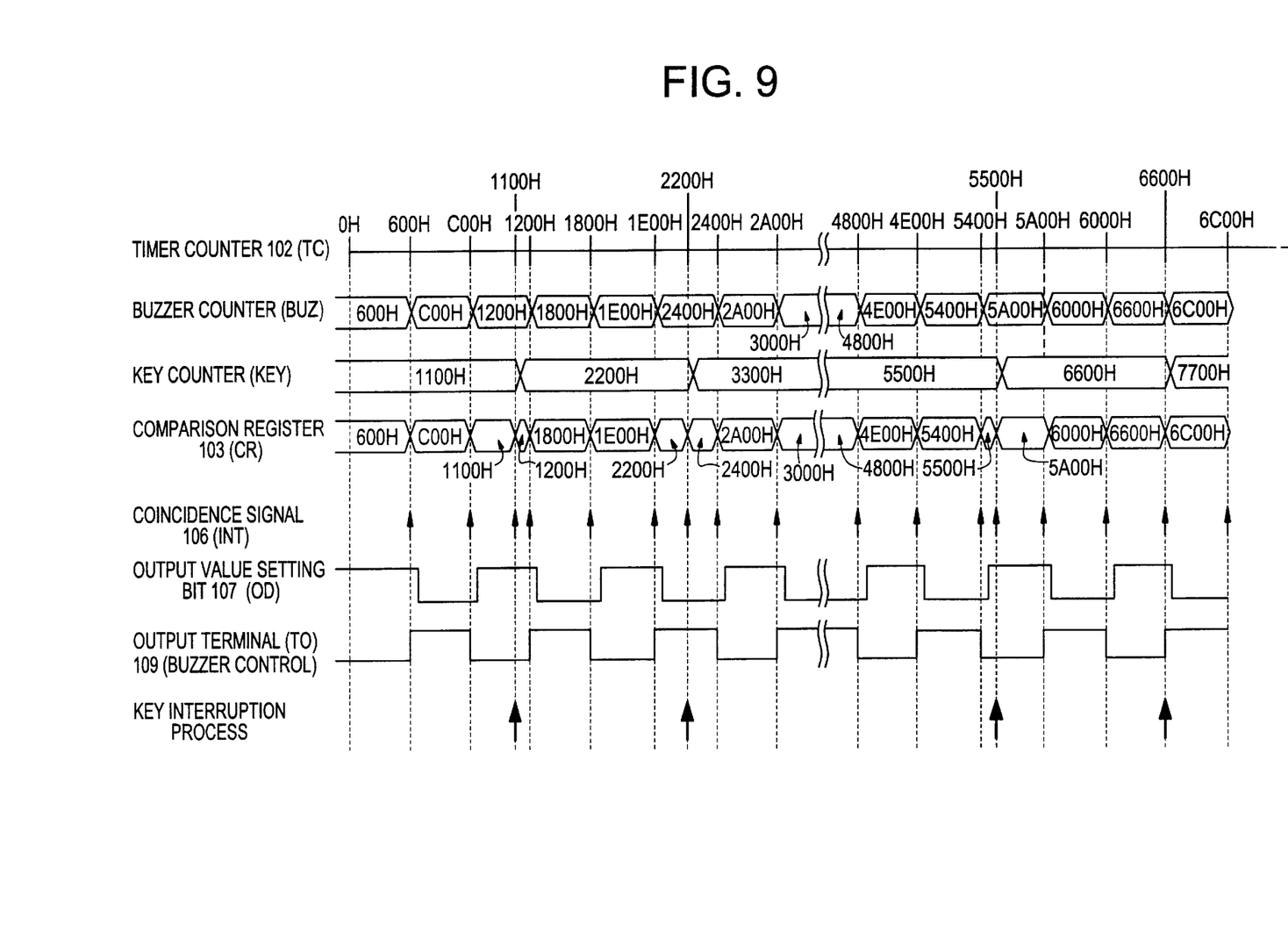
FIG. 9 is the processing timing chart of FIG. 7.

FIG. 9 shows a time chart for explaining the operation of the conventional timer device described above, and shows an example of buz_i=600 H, key_i=1100 H (Hexidecimel). The initial value 1100 H is set to the key counter (key) (Step 201). The initial value 600 H is set to the buzzer counter (buz) (Step 202). The value (600 H) of the buzzer counter (buz) is lower than the value (1100 H) of the key counter (key). Accordingly, the value (600 H) of the buzzer counter (buzz) is substituted for the comparison register (CR) 103 (Steps 203 and 205). Then, timer interruption is enabled to start the timer (Steps 206 and 207).

When the value of the timer counter (TC) 102 equalizes to the value (600 H) of the comparison register (CR) 103, the value of the output value setting bit (OD) 107 is output to the output terminal 109. Interruption is simultaneously generated. In the interruption routine, the value (600 H) of the buzzer counter (buz) is lower than that of the timer counter (TC) 102. Thus, the value of the buzzer counter (buz) is added to yield C00 H (Step 214). Comparison of the value (C00 H) of the added value of the buzzer counter (buz) with the value (1100 H) of the key counter (key) discloses that the value (C00 H) of the added buzzer counter (buz) is lower than the value (1100 H) of the key counter (key). Thus, the output value setting bit (OD) 107 is inverted (Steps 216, 217 or 218) to assign the value (C00 H) of the buzzer counter (buz) in the comparison register (CR) 103 (Step 219), terminating the interruption processing.

Now, when the value of the timer counter (TC) 102 equalizes to the value (C00 H) of the comparison register (CR) 103, the value of the output value setting bit (OD) 107 is output to the output terminal 109 (output of the output terminal 109 is inverted).

In the interruption routine, the value (C00 H) of the timer counter (TC) 102 is equal to the value (C00 H) of the buzzer counter (buz). Thus, buz_i=600 H is added to the value of the buzzer counter (buz). The value of the buzzer counter (buz) yields 1200 H (Steps 213, 214). Then, comparison of the value (1100 H) of the key counter (key) with the added value (1200 H) of the buzzer counter (buz) (Step 215) discloses that the value of the key counter (key) is lower than that of the buzzer counter (buz). Thus, the value (1100 H) of the key counter (key) is substituted in the comparison register (CR) 103, terminating the interruption processing (output value setting bit (OD) 107 is not allowed to inverse).

Now, when the value of the timer counter (TC) 102 equalizes to the value (1100 H) of the comparison register (CR) 103, the value of the output value setting bit (OD) 107 is output to the output terminal 109(output of the output terminal 109 is not inverted). Simultaneously, the interruption routine is activated.

In the interruption routine, the value (1100 H) of the timer counter (TC) 102 is compared with the value (1100 H) of the key counter (key) (Step 211). Since both the values are equal, key_i=1100 H is added to the value of the key counter (key). The value of the key counter (key) yields 2200 H (Steps 212). Then, key fetching processing is carried out. Comparison of the value (1200 H) of the buzzer counter (buz) with the value (2200 H) of the key counter (key) (Step 215) discloses that the value of the buzzer counter (buz) is lower than that of the key counter (key). Thus, the output value setting bit (OD) 107 is inverted (Steps 216, 217). The value (1200 H) of the buzzer counter (buz) is substituted for the comparison register (CR) 103 (Step 219), terminating the interruption processing.

In this way, executing this software inverses the output of the output terminal 109 for every 600 H of the timer counter (TC) 102 to sound a buzzer 405 in FIG. 11, carrying out data fetching processing for a key 406 for every 1100 H of the timer counter (TC) 102.

Figure 10A:
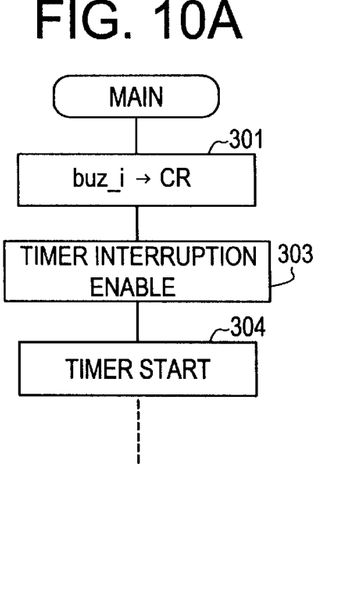
FIGS. 10A–10B are the flowcharts of the single processing software of the arithmetic unit connected to the conventional timer device of FIG. 7.
Figure 10B:
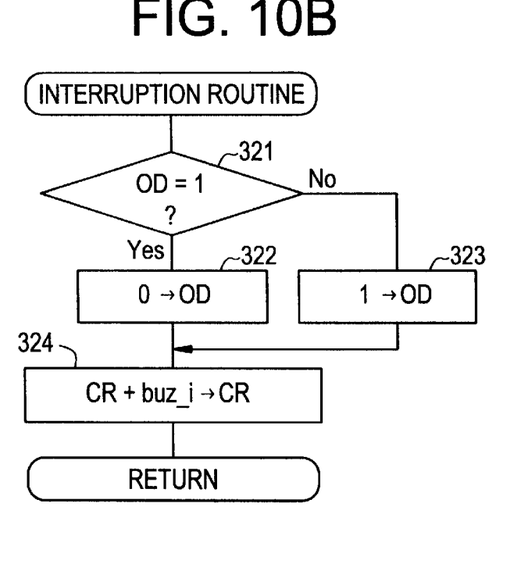

Now, timing for carrying out buzzer control only by using the conventional timer device is explained by referring to software flow charts in FIG. 10. The main program in FIG. 10A substitute buz_i for the comparison register (CR) 103 (Step 301) to enable the interruption of the timer device (Step 303), starting the timer (Step 304). In the interruption routine shown in FIG. 10B and activated in the CPU for every output of the coincidence signal from the timer device, the output value setting bit (OD) 107 is inverted (Steps 321, 322 or 323). Buz_i is then added to the comparison register (CR) 103. The added buz_i is set as a new value of the comparison register (CR) through the bus 404 (104) (Step 324).

The conventional timer device described above, however, requires for setting (for example, step 216 to 218 of FIG. 8B) of the output value setting bit (OD) 107 by the interruption process when the timer device is used for the inverse output of the output terminal 109. This prolongs software processing duration and result in problems access timing becomes tight.

SUMMARY OF THE INVENTION

It is an object of the present invention to provide a timer device capable of efficient operation with software.

Another object of the present invention is to design software timing problem-free, and to provide a timer device capable of reducing the time period of test by the use for the designed software.

A timer device of the present invention comprises: a timer counter for counting count clocks; a register; a coincidence detecting circuit for producing a coincidence signal when value stored in the register with value of the timer counter; a reverse enable flag which is set a flag; a signal generating circuit for reversing an output signal output to an output terminal when the flag indicates a value corresponding to inverse enabling and the coincidence signal is generated from the coincidence detecting circuit.

According to the present invention, the timer device is configured to inverse the output signal output to the output terminal when the inverse enable flag has the value showing inverse enabling and also when the coincidence signal is generated from the coincidence detecting circuit. Accordingly, an arithmetic unit connected to the timer device requires no software process for detecting the value of the output value setting bit (OD) and reversing the value of the output value setting bit (OD) in accordance with the detected value unlike conventional timer devices for latching the value of the output value setting bit (OD) by the coincidence signal to obtain an output signal.

BRIEF DESCRIPTION OF THE DRAWINGS

The above and other objects, advantages and features of the present invention will be apparent from the following description taken in conjunction with the accompanying drawings, in which.

DETAILED DESCRIPTION OF THE PREFERRED EMBODIMENTS

Figure 1:
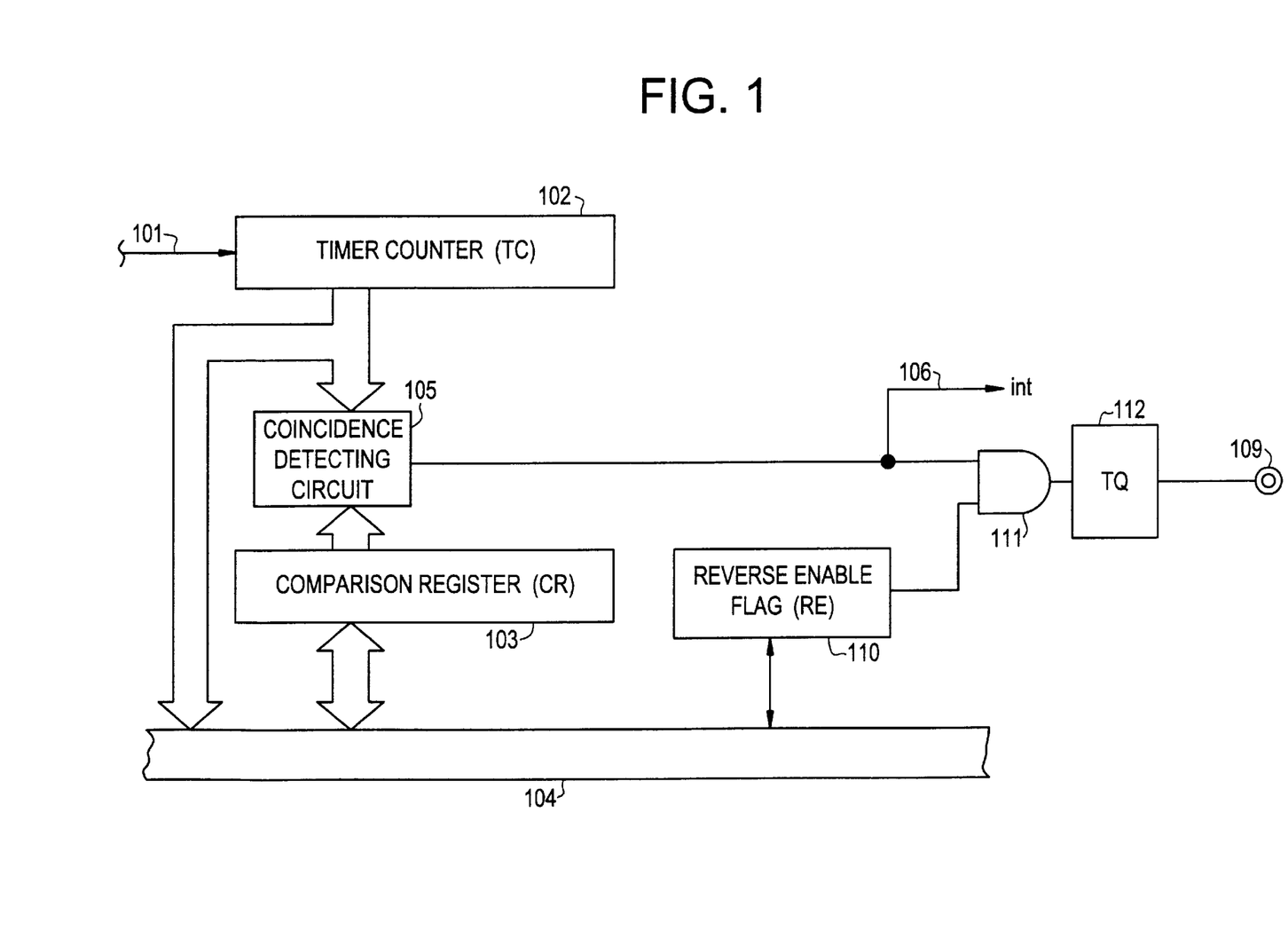
FIG. 1 is a block diagram of a first embodiment of a timer device according to the present invention.

FIG. 1 is a block diagram of a timer device according to a first embodiment of the present invention. In the figure, the same reference numerals are used as those in FIG. 7 in the same constituent components. According to the timer device of the embodiment shown in FIG. 1, a timer counter (TC) 102 is counted up by count clocks 101. A comparison register (CR) 103 is set to a number necessary for coincidence time as described later. A coincidence detecting circuit 105 compares the value of the timer counter (TC) 102 with that of the comparison register (CR) 103 to produce a coincidence signal 106 when both the values agree with each other. An AND circuit 111 as a logic circuit receives value of an inverse (reverse) enable (permission) flag (RE) 110 and a coincidence signal 106. A T-type flip-flop (T-F/F) 112 receives the output signal of the AND circuit 111 to a trigger input terminal T thereof to reverse its output signal (logic level, for example, "1" or "0") output to an output terminal 109.

A CPU (not shown) carries out data reading and data writing with respect to the comparison register (CR) 103 and the inverse enable flag (RE) 110 through a bus 104. The count value of the timer counter (TC) 102 is output through the bus 104 to the CPU (not shown).

Figure 2A:
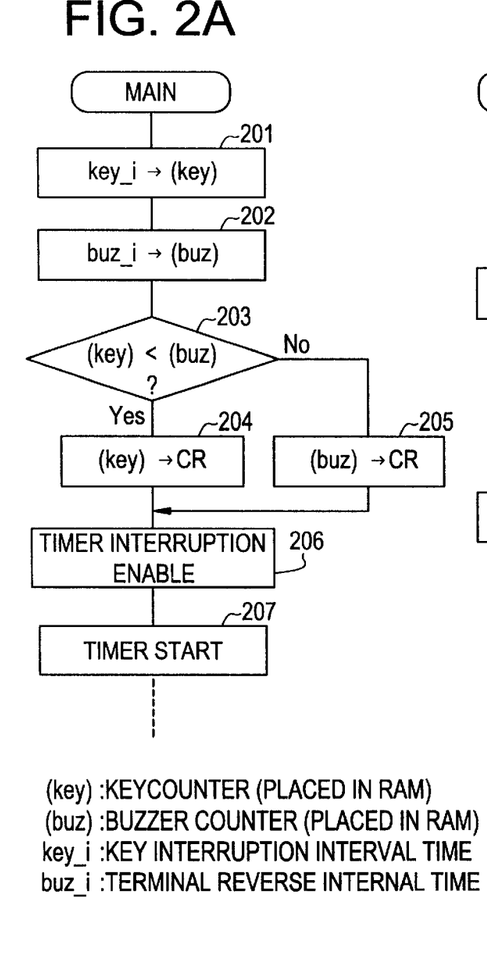
FIGS. 2A–2B are flowcharts of a parallel processing software of an arithmetic unit connected to the timer device of FIG. 1.
Figure 2B:
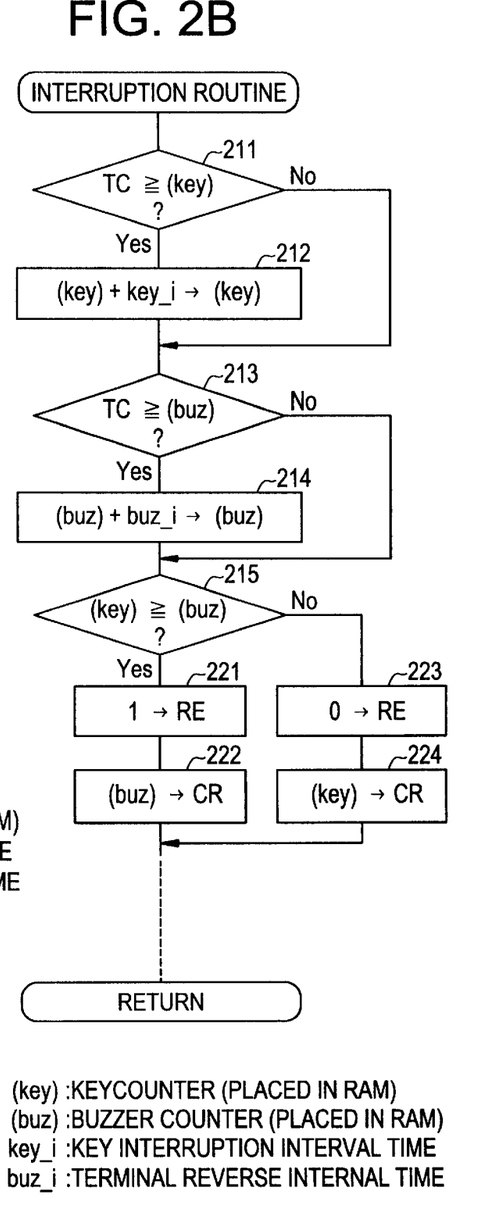

Next, the operation of the timer device of the embodiment shown in FIG. 1 is explained by referring to an example applied to a system for carrying out key matrix control and buzzer control shown in FIG. 11 and also by referring to software flowcharts in FIGS. 2A and 2B. In FIGS. 2A and 2B, the same reference numerals as those in FIGS. 8A and 8B are employed in the same process steps. A key counter (key) and a buzzer counter (buz) are provided in a RAM 402 in FIG. 11. As shown in FIG. 2A, a main (MAIN) program carried out by the CPU 403 in FIG. 11, substitutes the initial value key_i of key interruption interval time and the initial value buz_i of terminal inverse interval time for the key counter (key) and the buzzer counter (buz) (Steps 201 and 202).

Subsequently, the CPU 403 compares the value of the key counter (key) with that of the buzzer counter (buz) (Step 203). When the value of the key counter (key) is lower than that of the buzzer counter (buz), the value of the key counter (key) is supplied through the bus 404 (104) to the comparison register (CR) 103 in the timer device 401 (Step 204). When the value of the buzzer counter (buz) is lower than that of the key counter (key), the value of the buzzer counter (buz) is supplied through the bus 404 (104) to the comparison register (CR) 103 (Step 205). Interruption of the timer device is then enabled (Step 206) to start the timer device 401 having a construction shown in FIG. 1 (Step 207).

After starting the timer device 401, the value of the timer counter (TC) 102 is counted up for every input of clock pluse of signal 101. The coincidence detecting circuit 105 detects coincidence of the counted value with the set value of the comparison register (CR) 103, a coincidence signal 106 is output from the coincidence detecting circuit 105 when the two inputs are coincident. The coincidence signal 106 as an interruption signal is input to the CPU 403 in FIG. 11. Thus, the CPU 403 starts an interruption routine shown in FIG. 2B.

In the interruption routine in FIG. 2B, the value of the timer counter (TC) 102 is compared with that of the key counter (key) (Step 211). When the value of the key counter (key) is below that of the timer counter (TC) 102, the value of the key counter (key) is added and renewed by key_i (Step 212).

After the Step 212 process, or when the value of the timer counter (TC) 102 is lower than that of the key counter (key) in Step 211, the value of the timer counter (TC) 102 is compared with that of the buzzer counter (buz) (Step 213). When the value of the buzzer counter (buz) is below that of the timer counter (TC) 102, the value of the buzzer counter (buz) is added and renewed by buz_i (Step 214).

After the Step 214 process, or when the value of the timer counter (TC) 102 is lower than that of the buzzer counter (buz) in Step 213, the value of the key counter (key) is then compared with that of the buzzer counter (buz) (Step 215). When the comparison result discloses that the value of the buzzer counter (buz) is below that of the key counter (key), the CPU 403 substitutes "1" through the bus 404 (104) for the inverse enable flag (RE) 110 in FIG. 1 (Step 221), and also substitutes the value of the buzzer counter (buz) for the comparison register (CR) 103 (Step 222).

Meanwhile, in Step 215, when the comparison result discloses that the value of the buzzer counter (buz) is higher than that of the key counter (key), the CPU 403 substitutes "0" through the bus 404 (104) for the inverse enable flag (RE) 110 in FIG. 1 (Step 223), and also substitutes the value of the key counter (key) for the comparison register (CR) 103 (Step 224).

Figure 3:
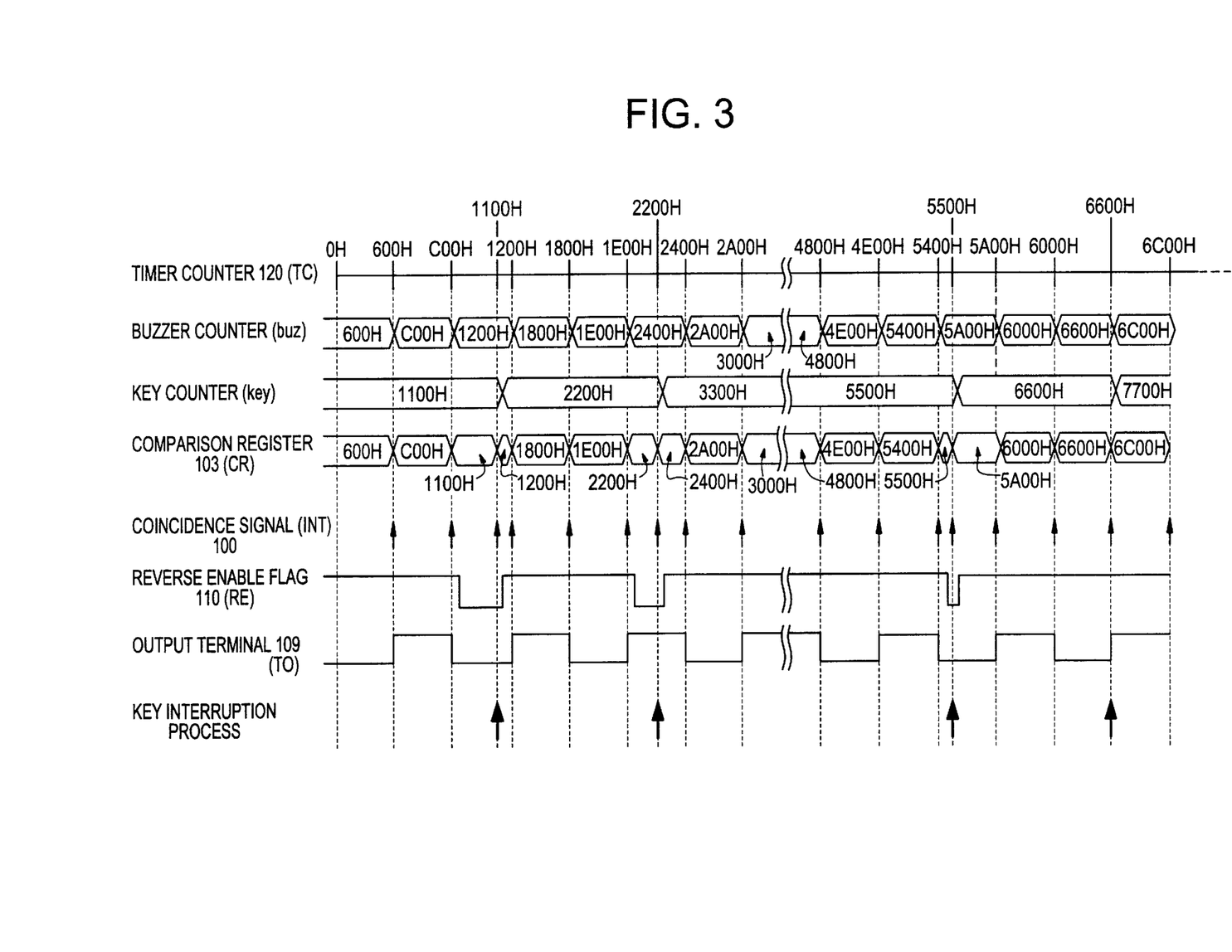
FIG. 3 is a processing timing chart for one example of the operation of a first embodiment of the present invention.

FIG. 3 shows a change in each value of the timer counter 102, the buzzer counter (buz), the key counter (key), and the comparison register (CR) 103, a change in each signal of the coincidence signal 106, the inverse enable flag (RE) 110, and the output terminal (TO) 109, and the timing of the key interruption processing. FIG. 3 shows an example that the terminal inverse interval time buz_i yields 600 H, the key interruption interval time key_i yields 1100 H as explained below.

The CPU 403 sets the initial value 1100 H to the key counter (key) (Step 201) and sets the initial value 600 H to the buzzer counter (buz) (Step 202) in accordance with the main program in FIG. 2A. The value of the key counter (key) is compared with that of the buzzer counter (buz) in their magnitudes (Step 203). In this case, the value (600 H) of the buzzer counter (buz) is lower than the value (1100 H) of the key counter (key). Thus, the CPU 403 sets the value (600 H) of the buzzer counter (biz) to the comparison register (CR) 103 in FIG. 1 (Step 205). Timer interruption is then enabled (Step 206) to start the timer (Step 207).

The above operation starts the counting of the counter clocks 101 by using the timer counter (TC) 102. When the value of the timer counter (TC) 102 equalizes to the value (600 H) of the comparison register (CR) 103, the coincidence signal 106 is output from the coincidence detecting circuit 105 to apply the coincidence signal 106 to the AND circuit 111. In the initial state, the inverse enable flag (RE) 110 is supposed to be set to "1," the above coincidence signal 106 is applied through the AND circuit 111 to the trigger terminal of the T-F/F 112 to inverse the output (The output signal from the output terminal 109 comes to high level as shown in FIG. 3, for example.).

The above coincidence signal 106 as the interruption signal is input to the CPU 403 in FIG. 11 to start the interruption routine shown in FIG. 2B. In this example, the value of the timer counter (TC) 102 is the same as the value (600 H) of the comparison register (CR) 103, namely, the initial value (600 H) of the buzzer counter (buz). Thus, the interruption routine renews the value C00H obtained by adding the initial value buz_i (600 H) to the value of the buzzer counter (buz) as the value of the buzzer counter (buz) (Steps 211 to 214).

When the value (C00 H) of the buzzer counter (buz) is lower than the value (1100 H) of the key counter (key), the CPU 403 substitutes "1" through the bus 404 (104) for the inverse enable flag (RE) 110 (Steps 215 and 221), and also substitutes the value (C00 H) of the buzzer counter (buz) for the comparison register (CR) 103 (Step 222) and terminates the interruption process. As a result, since the inverse enable flag 110 changes "1,", the AND circuit 111 in FIG. 1 is in an "through" gate state. That is, the AND circuit 111 is ready to output its output signal having a high logic level when a value of the timer counter 120 becomes C00 H and a coincidence signal is generated at that time. It is noted that when the inverse enable flag 110 is set to "1", the coincidence signal 106 has not yet been again generated (see waveforms of coincidence signal 100 and revcerse enable flag 110 in FIG. 3).

In addition, the timer counter (TC) 102 continues counting. Again, when the value (C00 H) of the comparison register (CR) 103 equalizes to the value of the timer counter (TC) 102, the coincidence signal 106 is output from the coincidence detecting circuit 105. The coincidence signal 106 triggers through the AND circuit 111 the T-F/F 112 to inverse the Q output signal of the T-F/F 112 output to the output terminal 109 to low level, for example.

Simultaneously, the CPU 403 starts the interruption routine shown in FIG. 2B by using the above coincidence signal 106. At this time point, when the value of the timer counter (TC) 102 is the same as the value (C00 H) of the buzzer counter (buz), the interruption routine renews the value 1200 H obtained by adding the initial value buz_i (600 H) to the value of the buzzer counter (buz) as the value of the buzzer counter (buz) (Steps 211 to 214).

When the value (1200 H) of the buzzer counter (buz) is higher than the value (1100 H) of the key counter (key), the CPU 403 substitutes "0" through the bus 404 (104) for the inverse enable flag (RE) 110 (Steps 215, 223) and also substitutes the value (1100 H) of the key counter (key) for the comparison register (CR) 103 (Step 224) and terminates the interruption process. As a result, since the inverse enable flag 110 is "0,", the AND circuit 111 is in a "no-through" gate state. That is, the AND cirucit 111 outputs its output signal having a low logic level regardless of the output of the coincidence detecting circuit.

In addition, the timer counter (TC) 102 continues counting. Again, when the value (1100 H) of the comparison register (CR) 103 equalizes to the value of the timer counter (TC) 102, the coincidence signal 106 is output from the coincidence detecting circuit 105. The coincidence signal 106 is inhibited by the AND circuit 111 from transmission to the trigger terminal T of the T-F/F 112. As a result, output signal from the output terminal 109 is not inverted.

Meanwhile, the CPU 403 starts the interruption routine shown in FIG. 2B by using the above coincidence signal 106. At this time point, the value of the timer counter (TC) 102 is the same as the value (1100 H) of the key counter (key). Accordingly, the interruption routine renews the value 2200 H obtained by adding the initial value key_i (1100 H) to the value of the key counter (key) as the value of the key counter (key) (Steps 211 and 212).

When the value (2200 H) of the key counter (key) is higher than the value (1200 H) of the buzzer counter (buz) the CPU 403 substitutes "1" through the bus 404 (104) for the inverse enable flag (RE) 110 (Steps 215, 221) and also substitutes the value (1200 H) of the buzzer counter (buz) for the comparison register (CR) 103 (Step 222) to terminate the interruption process. As a result, since the inverse enable flag 110 is "1," the AND circuit 111 is in an "through" gate state. That is, the AND circuit 111 is ready to output its output signal having a high logic level when a value of the timer counter 120 becomes 1200 H and a coincidence signal is generated at that time.

Once again, the timer counter (TC) 102 continues counting. Again, when the value (1200 H) of the comparison register (CR) 103 equalizes to the value of the timer counter (TC) 102, the coincidence signal 106 is output from the coincidence detecting circuit 105. The coincidence signal 106 triggers through the AND circuit 111 the T-F/F 112. As a result, the output signal Q of the T-F/F 112 output to the output terminal 109 is inverted to high level, for example.

Simultaneously, the CPU 403 starts the interruption routine shown in FIG. 2B by using the above coincidence signal 106. At this time point, the value of the timer counter (TC) 102 is the same as the value (1200 H) of the buzzer counter (buz). Accordingly, the interruption routine renews the value 1800 H obtained by adding the initial value buz_i (600 H) to the value (1200 H) of the buzzer counter (buz) as the value of the buzzer counter (buz) (Steps 211 to 214).

When the value (1800 H) of the buzzer counter (buz) is lower than the value (2200 H) of the key counter (key), the CPU 403 substitutes "1" through the bus 404 (104) for the inverse enable flag (RE) 110 (Steps 215 and 221) and also substitutes the value (1200 H) of the buzzer counter (buz) for the comparison register (CR) 103 (Step 222) to terminate the interruption process. As a result, since the inverse enable flag 110 is "1," the AND circuit 111 is in an "through" gate state. That is, the AND circuit 111 is ready to output its output signal having a high logic level when a value of the timer counter 120 becomes 1800 H and a coincidence signal is generated at that time.

As shown in FIG. 3, repeating the above operations inverses the output signal from the output terminal 109 for every 600 H-stepping of the value of the timer counter (TC) 102 to sound the output signal-supplied buzzer 405 in FIG. 11. In addition, the key fetching process is carried out for every 1100 H-stepping in the timer counter (TC) 102.

Next, the effects of the embodiments are explained. The effects are explained by assuming that total interruption process routine execution time in the time period for counting up is from 0 to 2500 H by the timer counter (TC) 102. In the flowchart shown in FIG. 8B, since either one of Step 211 or Step 213 is Yes, the number of steps passing through a first path consisting of Steps 211 to 219 is "7." The number of steps passing through a fourth path consisting of Steps 211 to 215, and 220 is "5." The values of the TC 102 passing through the first path is six times, such as "600 H," "C00 H," "1200 H," "1800 H," and "2400 H." The values of the TC 102 passing through a second path is two times, "1100 H," and "2200 H." When time required for the one step process is assumed to 100 ns, 5.2 $\mu$s (=(7×6 +5×2)×100 ns) is obtained.

On the contrary, in this embodiment of the present invention, the number of steps passing through the first path consisting of Steps 211 to 215, 221, and 222 in FIG. 2B is "6." The number of steps passing through the second path consisting of Steps 211 to 215, 223, and 224 is also "6." The number of steps passing through the first path and the second path is eight times in all as described above. Accordingly, total interruption process routine execution time in the time period for counting up from 0 to 2500 H by the timer counter (TC) 102 is 4.8 $\mu$s (=6×8×100 ns). The result reduces the processing time compared with the conventional processing time of 5.2 $\mu$s.

Figure 4A:
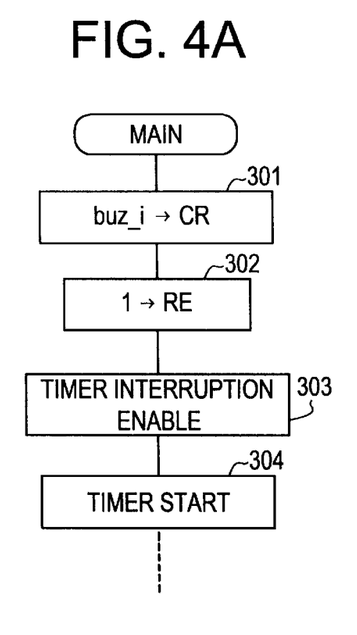
FIGS. 4A–4B are flowcharts of a single processing software of the arithmetic unit connected to the timer device of FIG. 1.
Figure 4B:
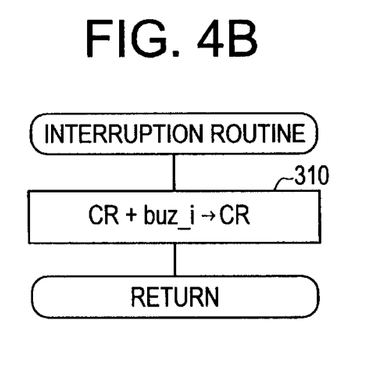

Next, the timing for carrying out buzzer control only by using the timer device of the first embodiment of the present invention is explained by using the software flowchart in FIGS. 4A and 4B. In the figure, the same reference numerals as those in FIG. 10 are employed in the same process steps. The main program shown in FIG. 4A buz_i is substituted for the comparison register (CR) 103 (Step 301). "1" is then substituted for the inverse enable flag (RE) 110 in FIG. 1 (Step 302) The interruption of the timer device is then enabled (Step 303) to start the timer (Step 304).

Further, in the interruption routine shown in FIG. 4B, buz_i is added to the comparison register (CR) 103 (Step 310) to terminate the interruption process. Thus, in this case, the output signal from the output terminal 109 is inverted for every stepping of the value of the timer counter (TC) 102 by the value of buz_i.

Figure 5:
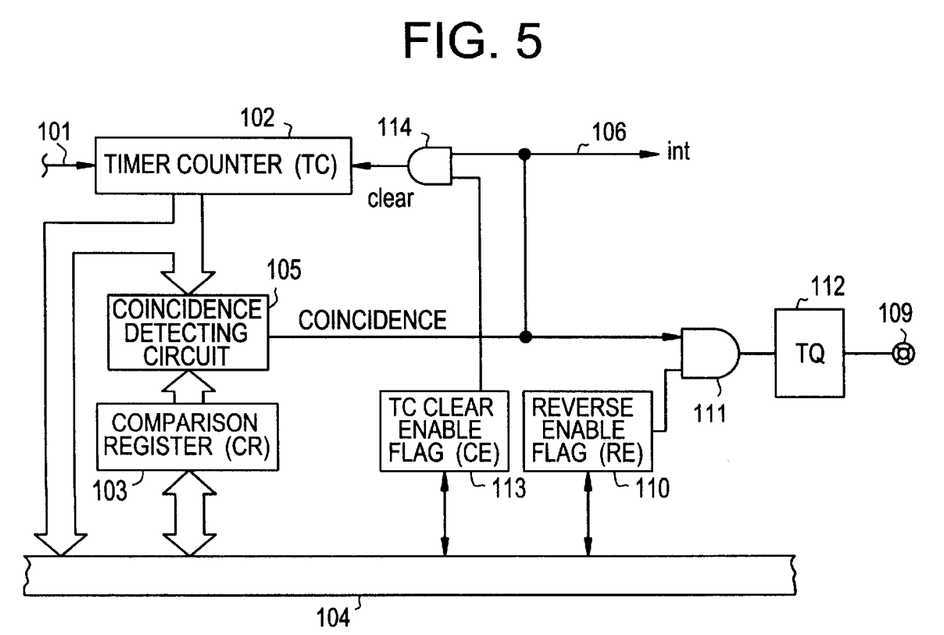
FIG. 5 is a block diagram of a second embodiment of the timer device according to the present invention.

Next, the timer device according to the second embodiment of the present invention is explained by using FIG. 5. In the figure, the same reference numerals as those in FIG. 1 are employed in the same constituent portions. Explanation thereof is omitted. As shown in FIG. 5, this timer device provides a clear enable flag (CE) 113 capable of writing and reading through the bus 104. The timer counter (TC) 102 is cleared by the output signal from an AND circuit 114 applying AND operation to the clear enable flag (CE) 113 and the coincidence signal 106.

Figure 6:
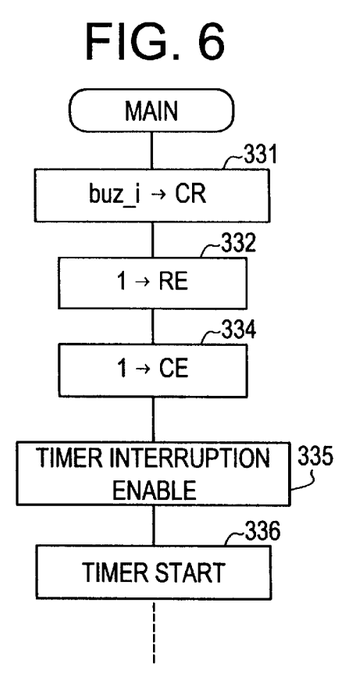
FIG. 6 is a flowchart of the single processing software of the arithmetic unit connected to the timer device of FIG. 5.

The operation for carrying out the buzzer control only by using the second embodiment is explained by the software flowchart in FIG. 6. Processing is done by the CPU connected through the bus 104 to the timer device. In the main (MAIN) program in FIG. 6, the CPU sets the terminal inverse interval time buz_i to the comparison register (CR) 103 (Step 331) to enable the inverse enable flag (RE) 110 to gate-open the AND circuit 111 "open" (Step 332). The TC clear enable flag (CE) 112 is enabled to gate-open the AND circuit (Step 333). The interruption of the timer device is enabled Step 334) to finally start the clock counting operation of the timer counter (TC) 102 (Step 335).

In this embodiment, if the value of the timer counter (TC) 102 steps to the value of the comparison register (CR) 103 set to the value of the terminal inverse interval time buz_i, the coincidence signal 106 is output from the coincidence detecting circuit 105. The coincidence signal 106 is then supplied through the AND circuit 111 to the trigger terminal of the T-F/F 112 to thereby inverse the output signal Q of the T-F/F 111 output to the output terminal 109, and simultaneously clears through the AND circuit 114 the timer counter (TC) 102 by the coincidence signal 106. This operation is repeated for every stepping of the value of the timer counter (TC) 102 to the comparison register (CR) 103 by the value of the terminal inverse interval time buz-i.

Therefore, the output signal from the output terminal 109 is inverted for every terminal inverse interval time buz_i. As a result, the output signal-supplied buzzer 405 in FIG. 11 may be buzzed. According to this embodiment, since interruption routine of the CPU is not required, further simplification of the software and reduction of the execution time may be made.

As described above, the timer device according to the present invention has the inverse enable flag for enabling or inhibiting inversion. Compared with the conventional timer device for obtaining the output signal by latching the value of the output value setting bit (OD) by the coincidence signal, the arithmetic unit connected to the timer device eliminates the need for the software process for detecting the value of the output value setting bit (OD) and for inverting the value of the output value setting bit (OD) based on the detected value. As a result, efficient operation of software is obtained even when the software is used as an absolute time timer for the terminal output process and the internal process, and even when the software is used as the terminal output process only, thereby reducing processing time, and realizing cost reduction.

In addition, according to the timer device of the present invention, when the timer counter is cleared for every coincidence signal input, and the inverse enable flag has the value showing inverse enabling, and also when the coincidence detecting circuit outputs the coincidence signal, the value of the register for comparing with the value of the timer counter is fixed to a given value by inverting the output signal to the output terminal. As a result, it is possible to eliminate the need for externally setting the value of the register by software, thereby further reducing software processing time by the arithmetic unit connected to the timer device.

It is apparent from the specification that the present invention is not limited to the above-described embodiments but may modified and changed without departing from the scope and spirit of the invention.

What is claimed is:

1. A timer device comprising:

a timer counter for counting count clocks;

a register;

a coincidence detecting circuit for producing a coincidence signal when a value of said register is coincident with a value of said timer counter;

an inverse enable flag circuit for ouputing an inverse enable flag signal; and a means for reversing an output signal output to an output terminal when said inverse enable flag has a value showing inverse enabling and said coincidence signal is produced from said coincidence detecting circuit.

2. The timer device as claimed in claim 1, wherein said means for reversing an output signal includes a logic circuit for passing said coincidence signal when said inverse enable flag has a value showing inverse enabling.

3. The timer device as claimed in claim 2, wherein said means for reversing an output signal includes a flip-flop for reversing said output signal when said gate circuit passes said coincidence signal.

4. The timer device as claimed in claim 3, wherein said logic circuit is an AND gate.

5. The timer device as claimed in claim 4, wherein said flip-flop is a T flip-flop.

6. The timer device as claimed in claim 1, further comprising a first counter which is set at a first value and a second counter which is set at a second value, wherein said register is set at the smaller one among said first value and said second value.

7. The timer device as claimed in claim 6, wherein when the value of said timer counter is coincident with that of said register, said first value is compared with said second value.

8. The timer device as claimed in claim 7, wherein when said first value is smaller than said second value, said register is set to the value which is said first value added to a value corresponding to a first interval time and said inverse enable flag circuit outputs said inverse enable flag indicating a value showing the inverse enabling.

9. The timer device as claimed in claim 7, wherein when said first value is larger than said second value, said register is set to the value which is said second value added to a value corresponding to a second interval time and said inverse enable flag circuit outputs said inverse enable flag indicating a value showing inverse inhibition.

10. The timer device as claimed in claim 1, further comprising means for clearing the timer counter after said coincidence detecting circuit outputs said coincidence signal.

11. A timer device comprising:

a timer counter for counting count clocks;

a register;

a coincidence detecting circuit for producing a coincidence signal when a value stored in said register is coincident with a value of said timer counter;

a reverse enable flag generator which sets an enable flag;

a signal generating circuit for reversing an output signal output to an output terminal when said enable flag indicates a value corresponding to inverse enabling and said coincidence signal is generated from the coincidence detecting circuit.

12. The timer device as claimed in claim 11, further comprising clear enable flag generator for clearing the timer counter when said coincidence detecting circuit outputs said coincidence signal.

13. The timer device as claimed in claim 11, wherein said signal generating circuit includes a logic circuit for passing said coincidence signal when said enable flag has a value showing inverse enabling.

14. The timer device as claimed in claim 13, wherein said signal generating circuit includes a flip-flop for reversing said output signal when said gate circuit passes said coincidence signal.

15. The timer device as claimed in claim 14, wherein said logic circuit is an AND gate.

16. The timer device as claimed in claim 15, wherein said flip-flop is a T flip-flop.

17. The timer device as claimed in claim 14, further comprising a first counter which is set a first value and a second counter which sets a second value, wherein said register is set to the smaller one among said first value and said second value.

18. The timer device as claimed in claim 17, wherein when said first value is smaller than said second value, the value of said timer counter is coincident with that of said register, and said first value is compared with said second value.

19. The timer device as claimed in claim 18, wherein when said first value is larger than said second value, said register is set to the value which is said first value added to a value corresponding to a first time interval and said reverse enable flag generator outputs said inverse enable flag indicating a value showing inverse generator enabling.

20. The timer device as claimed in claim 18, wherein when said register is set to a value which is said second value added to a value corresponding to a second time interval and said reverse enable flag generator outputs said inverse enable flag indicating a value showing inverse inhibition.

21. The timer device as claimed in claim 20, wherein said first counter is a key counter, said second counter is a buzzer counter, said first time interval is a key interruption time interval, and said second time interval is a terminal reverse time internal.

22. A method for controlling an output of an output terminal, comprising steps of:

setting first logic data to a flag circuit to permit reversing a logic level of said output terminal when an added value of a key counter is larger than an added value of a buzzer counter; and setting second logic data to said flag circuit to prohibit reversing a logic level of said output terminal when the added value of the key counter is smaller than the added value of the buzzer counter.

23. The method as claimed in claim 22, further including the steps of:

adding value of said key counter with a value corresponding to an initial key when a value of said timer counter is larger than said value of said key counter;

adding value of said buzzer counter with a value corresponding to an initial buzzer when a value of said timer counter is larger than said value of said buzzer counter.

* * * * *